(12) United States Patent
Schrader et al.

(10) Patent No.: US 8,166,604 B2
(45) Date of Patent: May 1, 2012

(54) APPARATUS FOR PREVENTING UNINTENTIONAL WIPER BLADE REMOVAL

(75) Inventors: Michael A. Schrader, Plain City, OH (US); Joshua L. Morrow, Dubin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 458 days.

(21) Appl. No.: 12/363,074

(22) Filed: Jan. 30, 2009

(65) Prior Publication Data
US 2010/0192322 A1 Aug. 5, 2010

(51) Int. Cl.
*B60S 1/58* (2006.01)
*B60S 1/34* (2006.01)

(52) U.S. Cl. ............ 15/250.19; 15/250.001; 15/250.16; 15/250.351

(58) Field of Classification Search ............ 15/250.001, 15/250.16, 250.19, 250.32, 250.351, 250.352
See application file for complete search history.

(56) References Cited

U.S. PATENT DOCUMENTS

| | | | | |
|---|---|---|---|---|
| 2,284,844 A * | 6/1942 | Rappl | .................. | 15/250.19 |
| 4,040,141 A * | 8/1977 | O'Steen | .................. | 15/250.19 |
| 4,293,974 A | 10/1981 | Gowans et al. | | |
| 4,345,352 A | 8/1982 | Terabayashi | | |
| 4,736,485 A | 4/1988 | Egner-Walter et al. | | |
| 4,765,019 A | 8/1988 | Ochino | | |
| 4,969,228 A | 11/1990 | Edwards et al. | | |
| 5,035,023 A | 7/1991 | Slingerland, Jr. | | |
| 5,263,759 A | 11/1993 | Brodie et al. | | |
| 5,415,453 A | 5/1995 | Huber | | |
| 5,675,861 A | 10/1997 | Ayers | | |
| 5,720,072 A | 2/1998 | Boissac | | |
| 5,774,927 A | 7/1998 | Morin | | |
| 6,119,302 A | 9/2000 | Egner-Walter et al. | | |
| 6,205,612 B1 | 3/2001 | Tilli et al. | | |
| 6,247,201 B1 | 6/2001 | McCray | | |
| 6,253,409 B1 | 7/2001 | Terai | | |
| 6,253,412 B1 | 7/2001 | Herrmann et al. | | |
| 6,553,608 B2 * | 4/2003 | Kraus et al. | .................. | 15/250.352 |
| 6,658,691 B2 | 12/2003 | Muramatsu | | |
| 6,675,430 B2 | 1/2004 | Hamamoto | | |
| 6,802,101 B2 | 10/2004 | Egner-Walter | | |
| 6,859,985 B1 | 3/2005 | Nakazawa et al. | | |
| 7,210,190 B2 | 5/2007 | Schmid et al. | | |
| 2005/0166349 A1 | 8/2005 | Nakano et al. | | |
| 2005/0198761 A1 | 9/2005 | Baskerville et al. | | |
| 2006/0064842 A1 | 3/2006 | Verelst et al. | | |

* cited by examiner

*Primary Examiner* — Gary Graham
(74) *Attorney, Agent, or Firm* — Clifford B. Vaterlaus, Esq.; Emerson Thomson Bennett

(57) ABSTRACT

A vehicle wiper assembly may include an arm and a wiper blade attached to the arm. The wiper assembly may be placed into a parked condition by supporting the wiper blade to a wiper lifter. To prevent unintentional removal of the wiper blade, as may occur for example in a car wash, the wiper blade remains irremovable from the arm due to physical interference between the wiper assembly and the wiper lifter. When removal of the wiper blade is desired, the wiper assembly may be manually moved to a position where the wiper blade can be removed from the arm without physical interference between the wiper assembly and the wiper lifter.

17 Claims, 8 Drawing Sheets

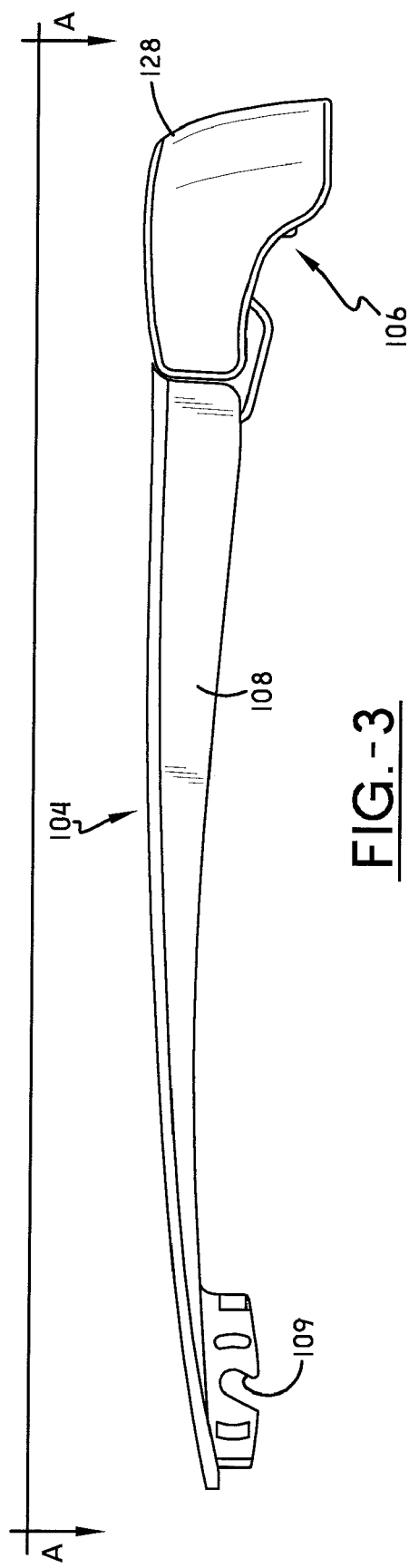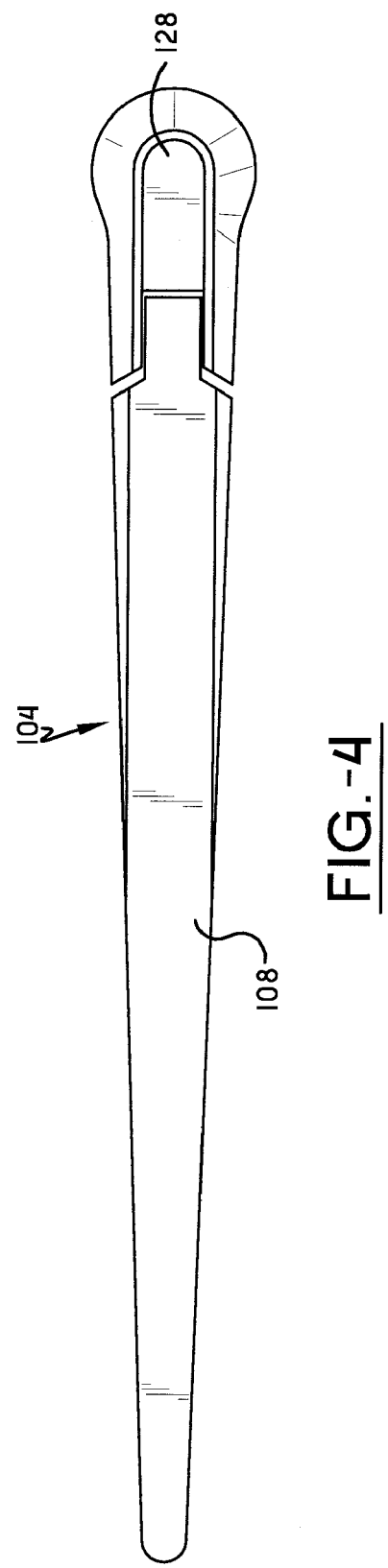

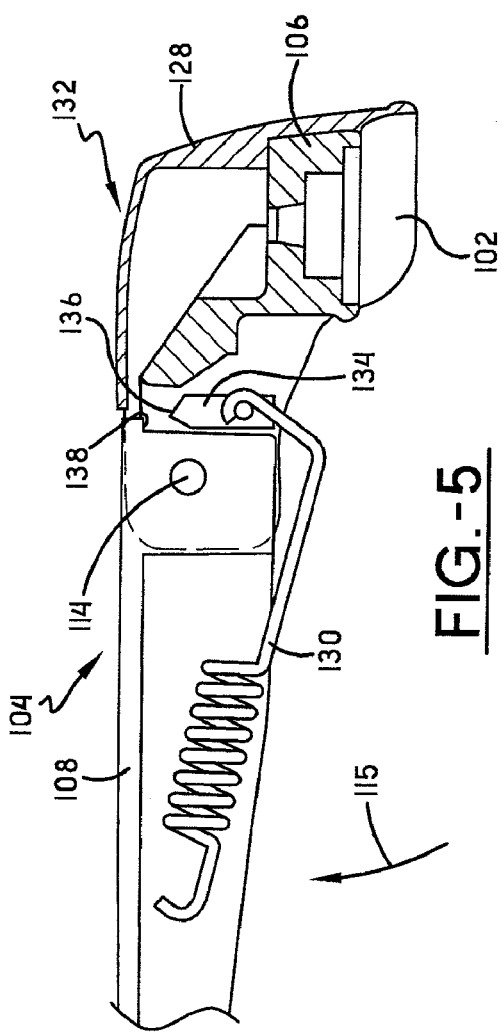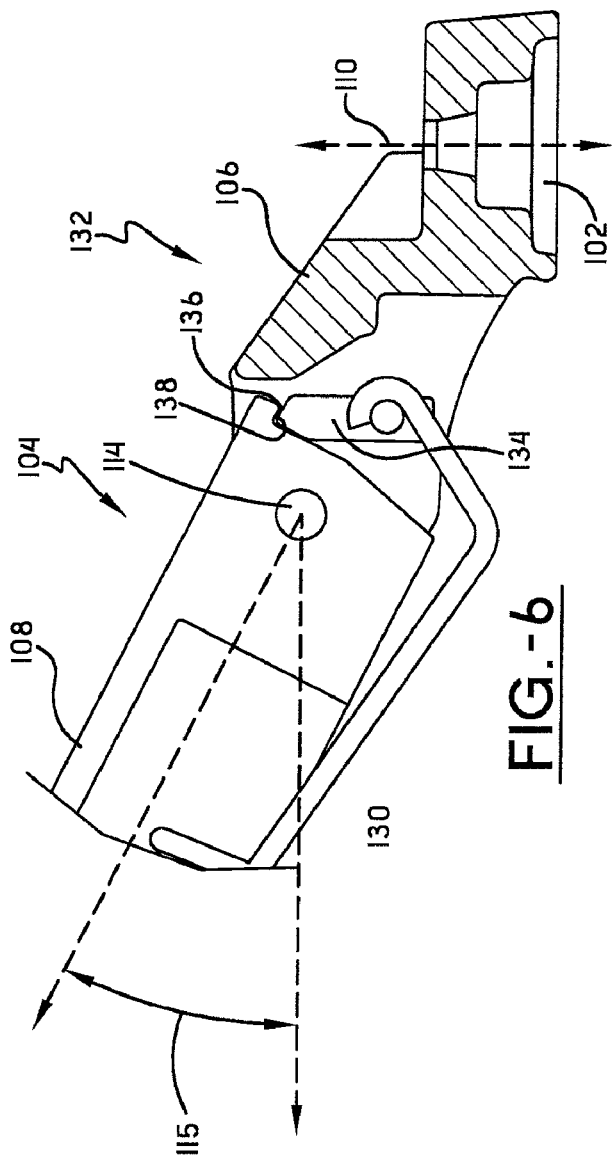

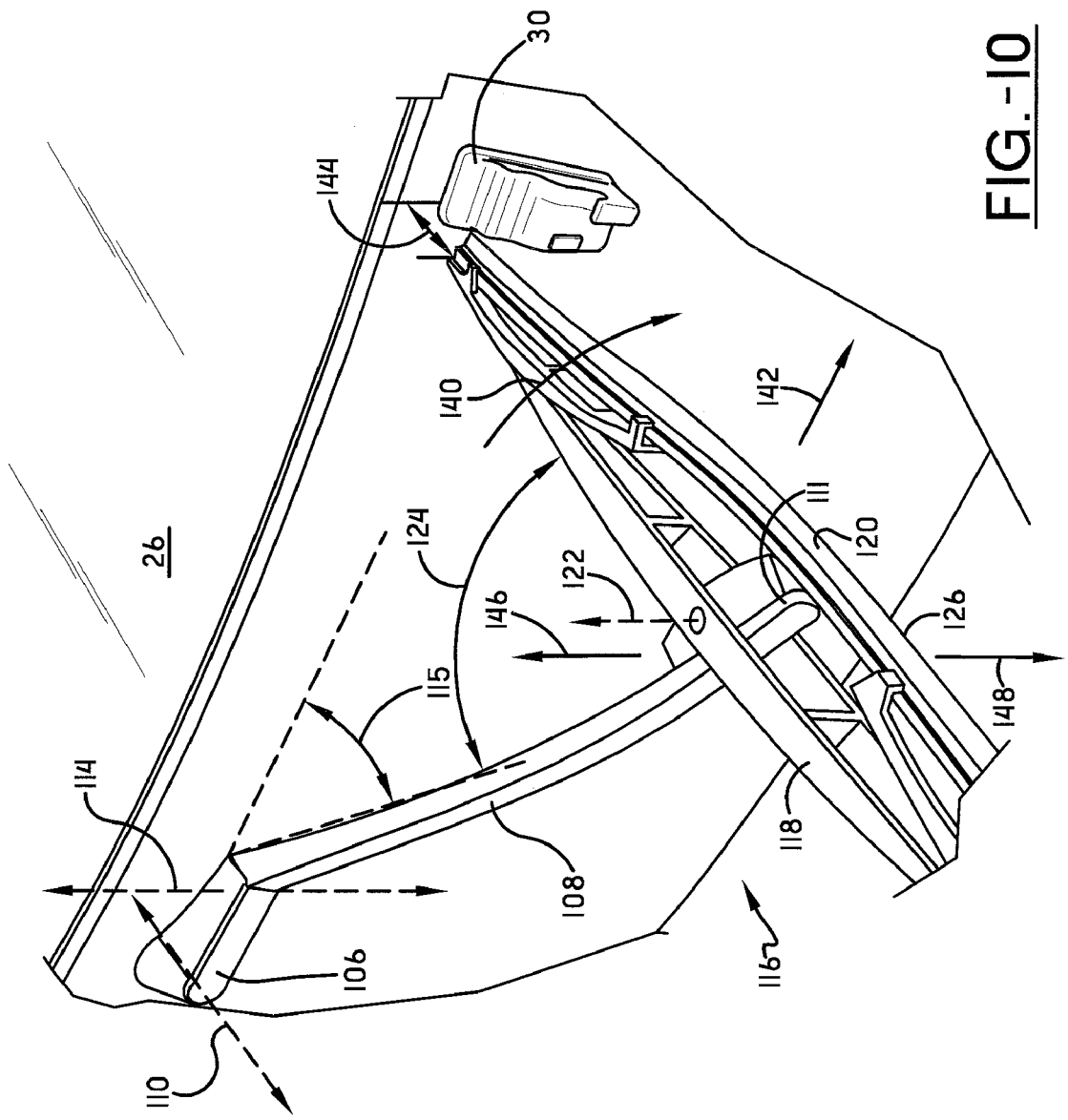

APPARATUS FOR PREVENTING UNINTENTIONAL WIPER BLADE REMOVAL

I. BACKGROUND OF THE INVENTION

A. Field of Invention

This invention pertains to the art of methods and apparatuses related to windshield wipers and more specifically to methods and apparatus related to preventing unintentional removal of wiper blades such as by a car wash.

B. Description of the Related Art

It is well known in the art to provide vehicles with devices commonly referred to as "windshield wipers" that are operated to clean and/or clear the front and sometimes the rear window or windshield through which vehicle passengers look. Such windshield wipers are typically pivoted across a portion of the outer surface of the windshield where they clear or wipe the windshield surface to remove water, snow, ice or debris.

It is also well known to place windshield wipers in a non-use or "park" position when they are not being used. Often, especially for rear windshields, the windshield wipers are positioned onto a wiper lifter, sometimes referred to as a ramp, to maintain the wiper in the parked position. Typically, placing the wiper onto the wiper lifter lifts the wiper away from the windshield and supports the wiper lifter to the vehicle without damaging the vehicle. In this way the windshield can be opened and closed without interference with the wiper.

While known windshield wipers and wiper lifters generally work well for their intended purpose, they are known to create a problem. This problem is related to the space or gap between the wiper arm, which attaches the wiper blade to the vehicle, and the outer surface of the vehicle when the wiper is in the parked position. Specifically, this gap makes it relatively easy for an automatic car wash cleaning strip or brush (or other unwanted object) to drop into the gap and then pullbackward on the wiper arm. It is known for such car wash strips to drop into the gap, pullbackward on the wiper arm as the car moves through the car wash and, rotate the wiper blade such that the wiper blade is removed from the arm. When this is the case, the removed wiper blade is often left on the floor of the car wash with the vehicle operator unaware of the problem until later—when it is necessary to replace the removed wiper blade.

In order to prevent this unintentional wiper removal problem, it is known to limit the pullback angle of the wiper arm. While this solution limits unintentional wiper removal, it creates significant inconvenience for wiper service. Specifically, small wiper arm pullback angles greatly increase the work required to remove the wiper when it is desirable to do so as the wiper arm must be detached from the vehicle before the wiper blade can be replaced. Once the wiper blade is replaced, the wiper arm must be reattached to the vehicle. Such wiper arm detachment and reattachment is cumbersome and may lead to damage to the wiper arm or the motor used to pivot the wiper across the windshield.

Therefore, what is needed is a method and apparatus that prevents unintentional removal of a wiper blade yet does so in a manner that permits easy removal of the wiper blade when it is desirable to do so.

II. SUMMARY OF THE INVENTION

According to one embodiment of this invention, a vehicle may comprise: a frame; a locomotion source supported to the frame for use in providing locomotion for the vehicle; a wiping surface supported to the frame; a wiper lifter that is juxtaposed to the wiping surface; and, a wiper assembly. The wiper assembly may comprise: (1) a motion generating device that is supported to the frame; (2) an arm that is operatively connected to the motion generating device and that is pivotal about a pullback pivot axis; and, (3) a blade assembly that is removably attachable to the arm and that comprises a blade having a contact surface. The wiper assembly may be positional into: (1) a first condition wherein: the pivot motion generating device pivots the arm; and, the blade contact surface contacts the wiping surface; (2) a second condition wherein the blade assembly contacts the wiper lifter to lift the blade away from the wiping surface; (3) a third condition wherein: the arm is pivoted away from the wiping surface about the pullback pivot axis to a pullback angle; and, the blade assembly is irremovable from the arm due to physical interference between the wiper assembly and the wiper lifter; and, (4) a fourth condition wherein: the arm is pivoted away from the wiping surface about the pullback pivot axis to the pullback angle; the blade assembly is moved substantially parallel to the pullback pivot axis; and, the blade assembly is removable from the arm without physical interference between the wiper assembly and the wiper lifter.

According to another embodiment of this invention, the wiper assembly may comprise a pivot limiter that limits the pivotal motion of the arm away from the wiping surface about the pullback pivot axis to a pivot limit angle.

According to another embodiment of this invention, a method may comprise the steps of: (A) providing a vehicle comprising: a frame; a locomotion source supported to the frame for use in providing locomotion for the vehicle; a body supported to the frame and comprising a windshield; and, a wiper lifter that is supported to the body juxtaposed to the windshield; (B) providing a wiper assembly comprising: (1) a motion generating device that is supported to the frame; (2) an arm that is operatively connected to the motion generating device and that is pivotal about a pullback pivot axis; and, (3) a blade assembly that is removably attachable to the arm and that comprises a blade having a contact surface; (C) providing the wiper assembly to operate in: (1) a first use condition wherein: the pivot motion generating device pivots the arm; and, the blade contact surface contacts the windshield; and, (2) a second parked condition wherein the blade assembly contacts the wiper lifter to lift the blade away from the wiping surface; (D) placing the wiper assembly into the second parked condition; (E) pivoting the arm away from the windshield about the pullback pivot axis to a pullback angle; (F) moving the blade assembly substantially parallel to the pullback pivot axis; (G) removing the blade assembly from the arm without physical interference between the wiper assembly and the wiper lifter; and, wherein after step (E) but before step (F) the blade assembly is irremovable from the arm due to physical interference between the wiper assembly and the wiper lifter.

According to yet another embodiment of this invention, a wiper system for a vehicle having a window may comprises: a wiper assembly comprising: (1) an arm pivotally attachable to the vehicle about a wiping pivot axis for movement of the arm across the window, wherein the arm is pivotal about a pullback pivot axis for movement of at least a portion of the arm to move away from the window; (2) a pivot limiter that limits movement of the arm about the pullback pivot axis to an extended position; (3) a blade assembly for contacting the window, wherein the blade assembly is pivotally attached to the arm about a blade pivot axis; and, (4) a lifter attachable to the vehicle for supporting the wiper assembly in a parked condition, wherein the lifter is positioned such that the blade assembly contacts the lifter when the arm is in the extended position and the blade assembly is pivoted about the blade pivot axis to thereby limit rotation of the blade assembly about the blade pivot axis.

One advantage of this invention is that unintentional removal of a wiper blade, such as may occur in a car wash, can be prevented.

Another advantage of this invention is that when removal of the wiper blade is desired, it can be easily accomplished.

Still other benefits and advantages of the invention will become apparent to those skilled in the art to which it pertains upon a reading and understanding of the following detailed specification.

III. BRIEF DESCRIPTION OF THE DRAWINGS

The invention may take physical form in certain parts and arrangement of parts, embodiments of which will be described in detail in this specification and illustrated in the accompanying drawings which form a part hereof and wherein:

FIG. 3 is a side view of a wiper assembly according to one embodiment of this invention.

FIG. 4 is a top view of the wiper assembly of FIG. 3 taken along line A-A.

FIG. 5 is a sectional view of a portion of a wiper assembly shown in a parked condition taken along line B-B of FIG. 7.

FIG. 6 is a sectional view of a portion of a wiper assembly similar to that shown in FIG. 5 but showing the wiper assembly in a pulled-back condition.

FIG. 10 is a close-up perspective view showing a wiper assembly in a pulled-back condition where the wiper blade is removable without physical interference between the wiper assembly and the lifter.

IV. DETAILED DESCRIPTION OF THE INVENTION

Figure 1:
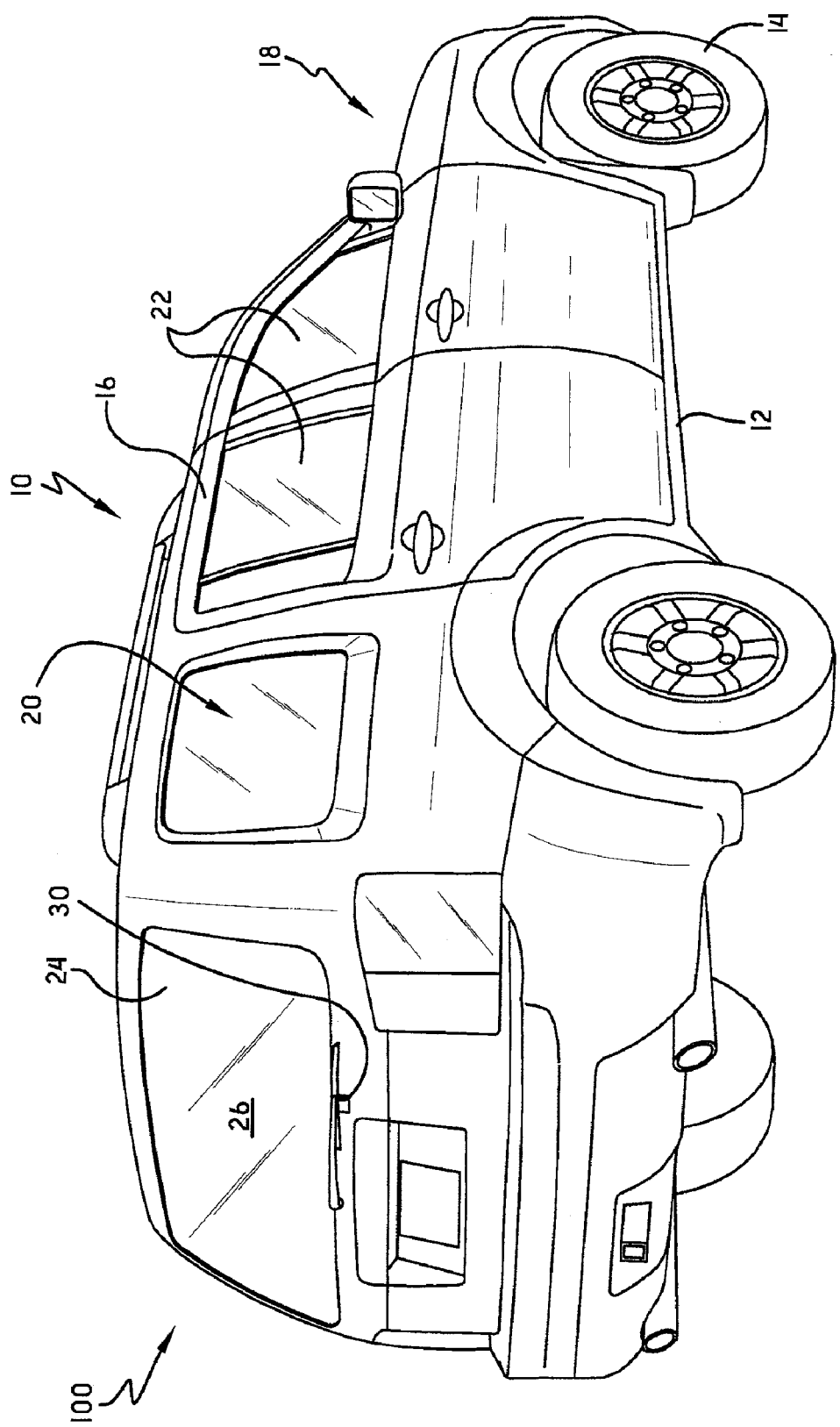
FIG. 1 is a rear perspective view of a vehicle.

Referring now to the drawings wherein the showings are for purposes of illustrating embodiments of the invention only and not for purposes of limiting the same, and wherein like reference numerals are understood to refer to like components, FIG. 1 shows a vehicle 10 that may be equipped with a wiper system including a wiper assembly 100, according to one embodiment of this invention. While the vehicle 10 shown in FIG. 1 is a sports utility vehicle (SUV), it is to be understood that the wiper assembly 100 of this invention will work with any vehicle including, for some non-limiting examples, vans, cars, trucks, airplanes, and boats. The vehicle 10 may include a frame 12, one or more ground engaging wheels 14 operatively mounted to the frame 12, a body 16 mounted to the frame 12, and a locomotion source 18 mounted to the frame 12 for use in providing locomotion for the vehicle 10. The locomotion source could be of any type chosen with the sound judgment of a person of skill in the art including, for some non-limiting examples, an internal combustion engine (ICE), an electric motor, and a so called "hybrid" which combines an ICE with an electric motor.

Figure 2:
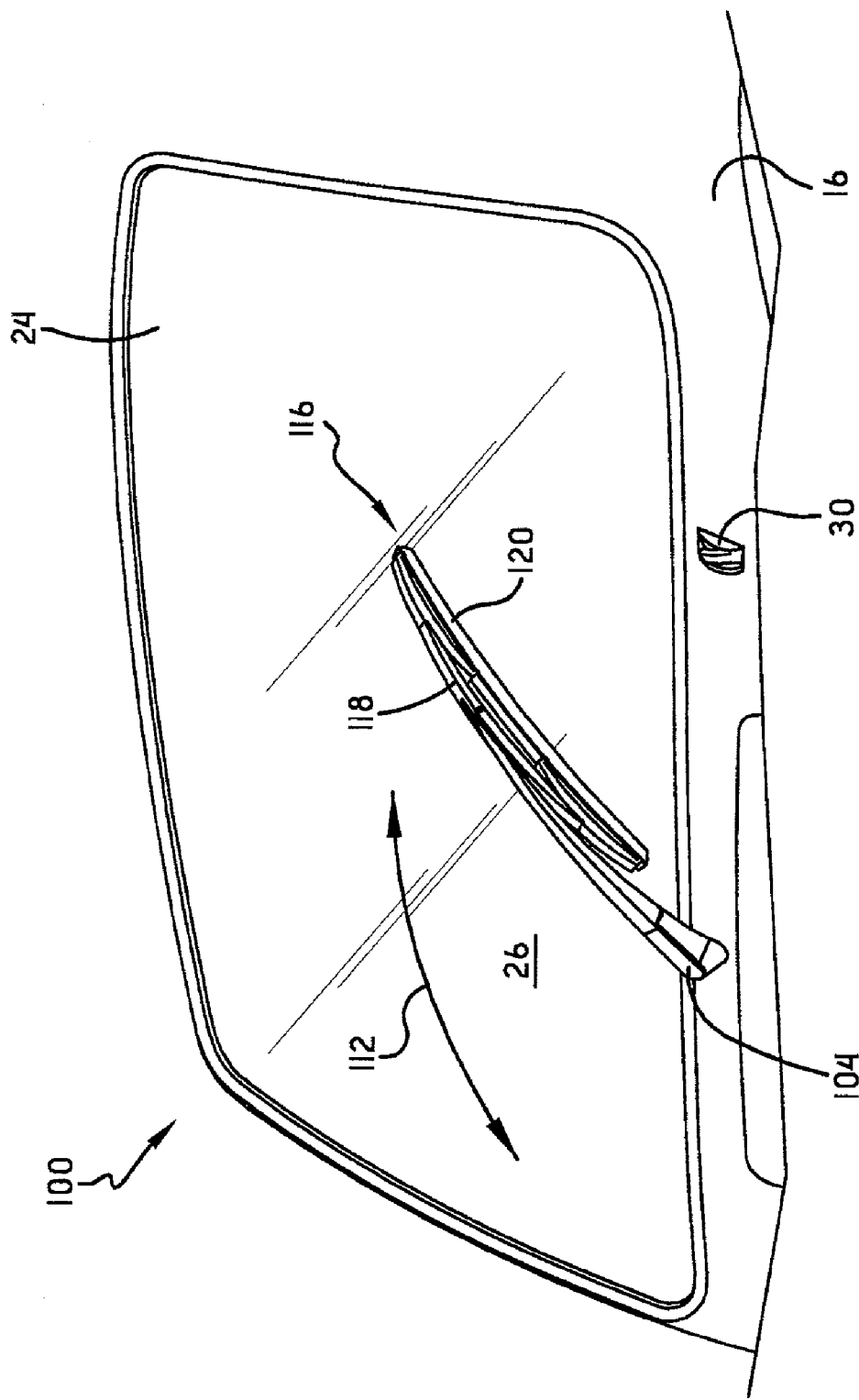
FIG. 2 is a close-up view of the vehicle of FIG. 1 but showing the wiper assembly in a use condition.
Figure 7:
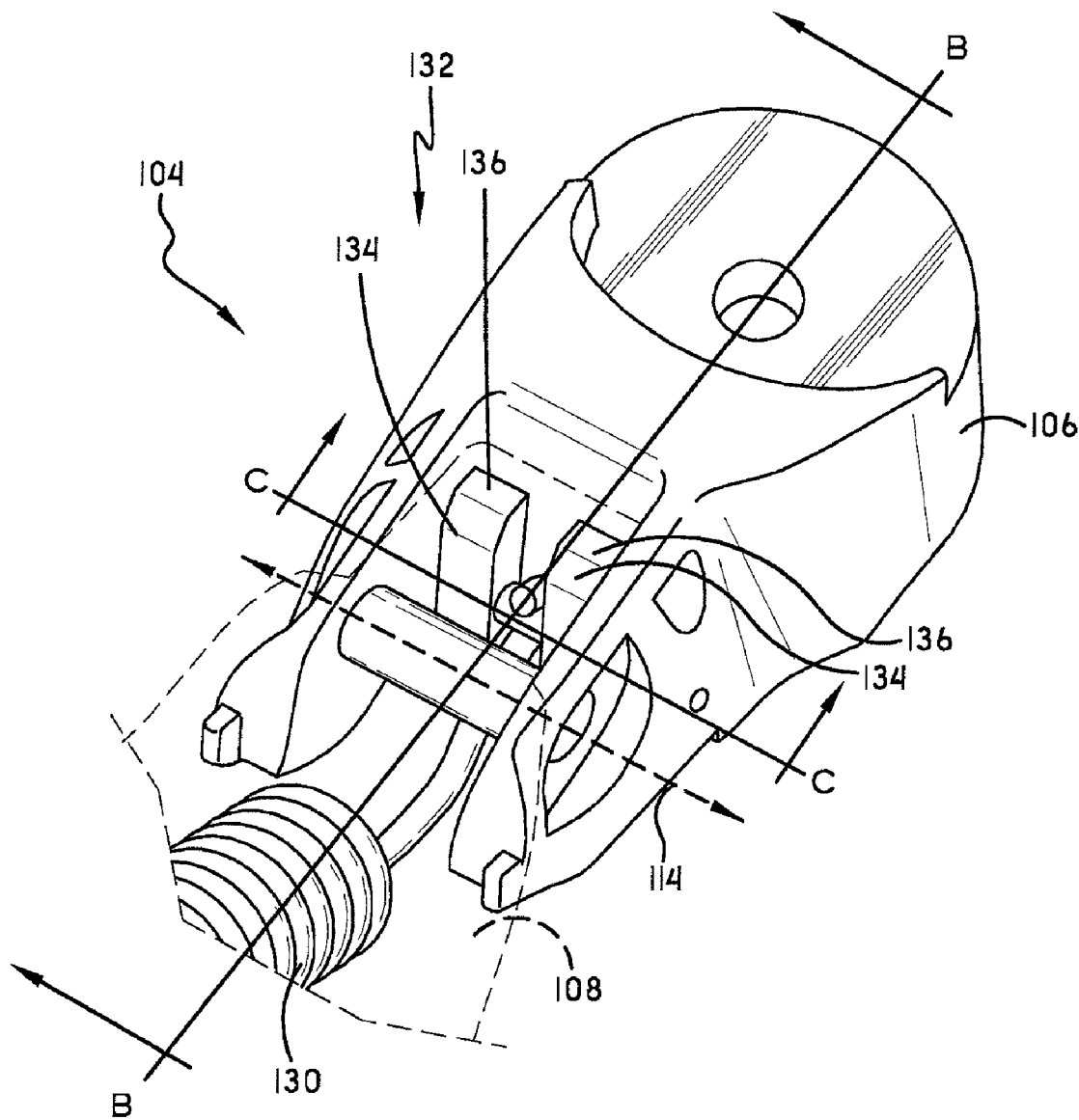
FIG. 7 is a perspective close-up view of a portion of a wiper assembly according to one embodiment of this invention shown partially in phantom for clarity.
Figure 8:
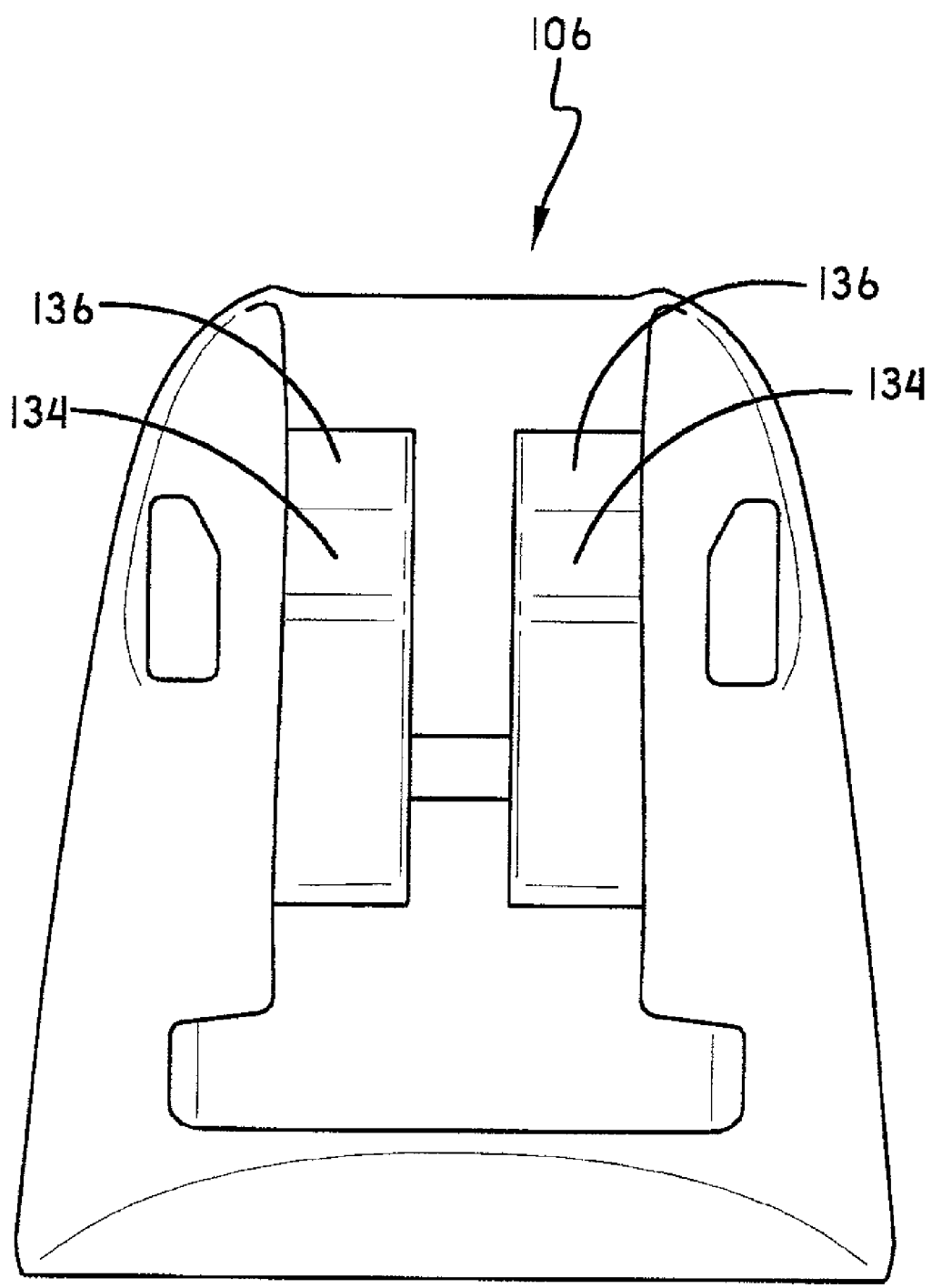
FIG. 8 is a sectional view of the wiper lifter assembly taken along the line C-C in FIG. 7.

With reference now to FIGS. 1-2, the body 16 may define an interior 20 which may house passengers and/or cargo as is well known in the art. The interior 20 may have a perimeter that includes a front window or windshield (not visible), one or more side windows or windshields 22 and a rear window or windshield 24. The vehicle's wiper system may include at least one wiper assembly 100, which is used to wipe and thereby clean or clear a wiping surface 26 on the vehicle 10. While the wiper assembly 100 will be described in further detail below, it is to be understood that this invention can be used with any type and/or style of wiper assembly chosen with the sound judgment of a person of skill in the art. Similarly, while the wiping surface 26 shown in FIGS. 1-2 is the outer surface of the rear windshield 24, it is to be understood that this invention can be used with a wiper assembly used to wipe any vehicle wiping surface chosen with the sound judgment of a person of skill in the art. Some additional non-limiting examples of vehicle wiping surfaces include the exterior surfaces of the side windows 26 and the front windshield. A wiper lifter 30 may be attached to the body 16 (or other vehicle surface) juxtaposed to the windshield 24 and used, as is well known in the art, to support the wiper assembly 100 in a non-use or parked condition. In one embodiment, the lifter 30 lifts the wiper assembly 100 away from the windshield 24, and/or body 16, and/or other vehicle surface and thereby relieves unwanted pressure from the wiper assembly. It should be noted that the number, style, and mounting location for the lifter 30 or lifters can be any chosen with the sound judgment of a person of skill in the art.

With reference now to FIGS. 1-10, the wiper assembly 100 may include a pivot motion generating device 102 (see FIGS. 5 and 6) that is supported to the frame 12 and used to pivot the wiper assembly 100 in any manner chosen with the sound judgment of a person of skill in the art. The pivot motion generating device 102 may be, for one non-limiting example, an electric motor powered by the locomotion source 18. The wiper assembly 100 may also include an arm or arm assembly 104 that may have first and second arm members 106, 108. The first arm member 106 may be operatively attached to the pivot motion generating device 102 so that the pivot motion generating device 102 may pivot the arm assembly 104 about a wiping pivot axis 110 (see FIGS. 6 and 10) and through a wiping angle 112 (see FIG. 2). A cover 128 (shown removed in FIGS. 6-8) may be positioned over the first arm member 106 to protect it. The second arm member 108 may be pivotally attached to the first arm member 106 about a pullback pivot axis 114 (see FIGS. 5-7) and through a pullback angle 115 (see FIGS. 5-6 and 10). A biasing mechanism, such as spring 130 (see FIGS. 5-7), may be used to bias the second arm member 108 into an "against the wiping surface" position so that a later to be described wiper blade 120 is biased toward the wiping surface 26. A pivot limiter 132 may be used to limit the available pullback angle 115 to a pivot limit angle establishing an extended position for the arm assembly 104. The specific pivot limit angle may be, in one embodiment, greater than 10 degrees and less than 40 degrees. In a more specific embodiment, the pivot limit angle may be greater than 20 degrees and less than 30 degrees. The pivot limiter 132 can be of any type chosen with the sound judgment of a person of skill in the art. In one embodiment, the pivot limiter 132 includes at least one stopper 134 (see FIGS. 5-8), two shown, attached to the first arm member 106 and having a contact surface 136 that engages with a contact surface 138 formed in the second arm member 108. In one embodiment, the contact surface 136 of the stopper 134 is designed to match the contact surface 138 of the second arm member 108 to improve the engagement connection. In one specific embodiment one of the contact surfaces has a convex shape while the other contact surface has a concave shape that receives the convex shape to improve engagement. For the embodiment shown, the contact surface 136 of the stopper 134 has a convex shape while the contact surface 138 of the second arm member 108 has a concave shape. Other such matching engagement shapes chosen with the sound judgment of a person of skill in the art will also work with this invention.

Figure 9:
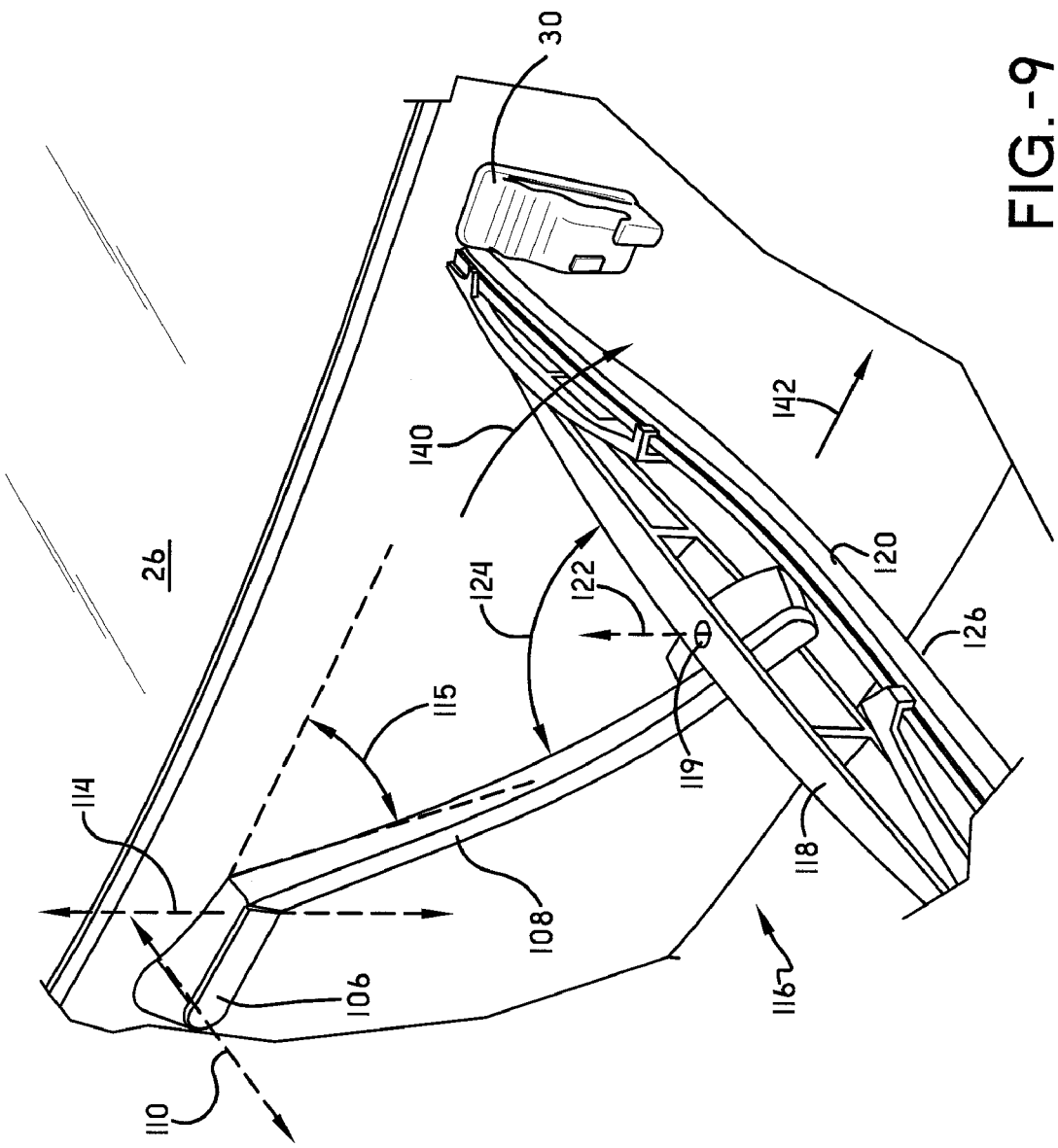
FIG. 9 is a close-up perspective view showing a wiper assembly in a pulled-back condition where the wiper blade is irremovable due to physical interference between the wiper assembly and the lifter.

With reference now to FIGS. 1-2 and 9-10, the wiper assembly 100 may also include a blade assembly 116 that may have a blade attachment member 118 and a blade 120. The blade attachment member 118 may be pivotally attached to the arm assembly 104 about a blade pivot axis 122 through a blade angle 124 (see FIG. 9) in any manner chosen with the sound judgment of a person of skill in the art. In one specific embodiment, the blade attachment member 118 has a shaft or pin 119, defining the blade pivot axis 122, that is received in an opening 109 formed in the second arm member 108 (shown in FIG. 3). The blade attachment member 118 may also be removably connected to the second arm 108 so that it can be easily attached and detached from the second arm member 108 (with an exception to be discussed further below). In one embodiment, the attachment member 118 is removed from the second arm member 108 by the application of a force to cause a lateral or sliding movement 142 of the attachment member 118 relative to the second arm member 108. In another embodiment, the attachment member 118 is removed from the second arm member 108 with the application of a force to cause a rotational movement 140 relative to the second arm member 108. In one specific embodiment, the attachment member 118 is rotated about the shaft 109 until a portion of the blade assembly 116 (the mid-portion of the blade 120, for example) contacts a portion of the arm assembly 104 (the distal end 111 of the second arm 108, for example). This is shown in FIGS. 9 and 10. Continued rotation of the blade attachment member 118 causes the shaft 119 to come out of the opening 109 thereby removing the blade assembly 116 from the arm assembly 104. Any relative motion of the blade attachment member 118 relative to the second arm member 108 required to remove the blade attachment member 118 chosen with the sound judgment of a person of skill in the art will work with this invention. The blade 120, which may be formed of rubber, may be attached to the blade attachment member 118 in any manner chosen with the sound judgment of a person of skill in the art and may have a contact surface 126 used to contact and "wipe" the wiping surface 26 as is well known in the art.

With reference now to FIGS. 1-2, the wiper assembly 100 may be placed or positioned into four conditions or modes of operation. The first condition may be considered a "use" condition because it is the well known mode where the pivot motion generating device 102 pivots the first arm member 106 while the blade contact surface 126 contacts the wiping surface 26 to thereby clear or wipe the wiping surface 26 to remove water, snow, ice or debris. The first condition is illustrated in FIG. 2. The second condition may be considered a "parked" condition because it is the well known mode where at least some portion of the blade assembly 116 contacts and is supported on the lifter 30 to thereby lift the blade 120 away from the wiping surface 26. The second condition is illustrated in FIG. 1.

With reference now to all the FIGURES, the third condition into which the wiper assembly 100 may be placed or positioned may be considered a "prevent removal" mode as it prevents the blade attachment member 118 from being unintentionally removed, such as by the cleaning strips or brushes used in a car wash. As a typical example, the vehicle 10 may enter a car wash with the wiper assembly 100 in the first parked condition illustrated in FIG. 1. During the washing of the vehicle 10, the cleaning strips may apply a force to pivot the second arm member 108 away from the windshield 24 about the pullback pivot axis 114 as shown in FIG. 9. Note first that this pivoting of the second arm member 108 through the pullback angle 115 is necessary but not sufficient to remove the blade attachment member 118 because the blade attachment member 118 must be further adjusted before it can be removed. Note second that this pivoting of the second arm member 108 through the pullback angle 115 is limited by the pivot limiter 132. In some cases, the cleaning strips may also apply a force to cause a lateral or sliding movement 142 and/or a rotational movement 140. The combination of these forces applied to the blade attachment member 118 may seem to be sufficient to remove the blade attachment member 118. However, removal of the blade attachment member 118 is prevented because the relative movement of the blade attachment member 118 (in direction 140, 142 or other such direction) is inhibited or restrained by the lifter 30. Specifically, the blade attachment member 118 physically contacts the lifter 30 and its further motion is prevented. As a result, the blade attachment member 118 is irremovable from the second arm member 108 due to physical interference between the wiper assembly 100 and the wiper lifter 30.

With continuing reference to all the FIGURES, the fourth condition into which the wiper assembly 100 may be placed or positioned may be considered a "removal" mode as it is the mode whereby the blade attachment member 118 can be easily removed by an operator if, for example, the blade attachment member 118 needs to be replaced. In this case, the vehicle 10 may first have the wiper assembly 100 placed into the first parked condition illustrated in FIG. 1. The operator may then pivot the second arm member 108 away from the windshield 24 about the pullback pivot axis 114 as shown in FIG. 10. Note that this pivoting of the second arm member 108 through the pullback angle 115 is limited by the pivot limiter 132. The operator may then pivot the blade attachment member 118 about blade pivot axis 122 to the position shown in FIG. 10. Note that after this motion the blade 120 is substantially perpendicular to the wiping surface 26 yet no portion of the blade assembly 116 physically contacts the vehicle body 16 or wiping surface 26 as there is a clearance space 144 between the proximal end of the blade attachment member 118 and blade 120 and the vehicle outer surface. While this clearance space 144 can be any chosen with the sound judgment of a person of skill in the art, in one embodiment it is at least 10 millimeters. The operator may then move the blade assembly 116 to prevent interference between the wiper assembly 100 and the wiper lifter 30. This motion can be any chosen with the sound judgment of a person of skill in the art. In one embodiment, this motion is substantially parallel to the pullback pivot axis 114, in an upward direction 146 or downward direction 148 (shown in FIG. 10). The capability of the wiper assembly 100 to be moved in upward direction 146 or downward direction 148 may be achieved simply with the inherent flexibility of the wiper assembly 100. In alternate embodiments, pivoting or sliding motion of the wiper assembly 100 may built into the design. In any case, after the operator moves the blade assembly 116 in upward direction 146 or downward direction 148 the operator may then move the blade attachment member 118 in direction 140 or 142 to remove the blade attachment member 118 without physical interference between the wiper assembly 100 and the wiper lifter 30.

Numerous embodiments have been described, hereinabove. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

We claim:

1. A vehicle comprising:
   a frame;
   a locomotion source supported to the frame for use in providing locomotion for the vehicle;
   a wiping surface supported to the frame;
   a wiper assembly comprising:
   (1) a motion generating device that is supported to the frame;
   (2) an arm that is operatively connected to the motion generating device and that is pivotal about a pullback pivot axis;
   (3) a blade assembly that is removably attachable to the arm; that comprises a blade having a contact surface; and, that is pivotally attached to the arm about a blade pivot axis by attachment means;
   a wiper lifter that is juxtaposed to the wiping surface;
   wherein the wiper assembly is positional into:
   (1) a first condition wherein: the pivot motion generating device pivots the arm; and, the blade contact surface contacts the wiping surface;
   (2) a second condition wherein the blade assembly contacts the wiper lifter to lift the blade away from the wiping surface;
   (3) a third condition wherein: the arm is pivoted away from the wiping surface about the pullback pivot axis to a pullback angle; and, the blade assembly is irremovable from the arm by retention of the attachment means due to physical interference between the wiper assembly and the wiper lifter when the blade assembly is pivoted about the blade pivot axis; and,
   (4) a fourth condition wherein: the arm is pivoted away from the wiping surface about the pullback pivot axis to the pullback angle; the blade assembly is moved substantially parallel to the pullback pivot axis; and, the blade assembly is removable from the arm by release of the attachment means without physical interference between the wiper assembly and the wiper lifter when the blade assembly is pivoted about the blade pivot axis.

2. The vehicle of claim 1 wherein:
   the wiper assembly comprises: a pivot limiter that limits the pivotal motion of the arm away from the wiping surface about the pullback pivot axis to a pivot limit angle; and,
   the pivot limit angle is the pullback angle.

3. The vehicle of claim 2 wherein the pivot limit angle is greater than 10 degrees and less than 40 degrees.

4. The vehicle of claim 3 wherein the pivot limit angle is greater than 20 degrees and less than 30 degrees.

5. The vehicle of claim 1 wherein:
   the attachment means comprises: a blade attachment member that: (1) is pivotally attached to the arm about the blade pivot axis; and, (2) is attached to the blade; and,
   the blade pivot axis is substantially parallel to the pullback pivot axis.

6. The vehicle of claim 5 wherein:
   when the wiper assembly is positioned into the third and fourth conditions, the blade attachment member is pivotal about the pullback pivot axis into a position where a longitudinal axis of the blade is substantially perpendicular to the wiping surface without the blade assembly physically contacting the wiping surface.

7. The vehicle of claim 5 wherein:
   the arm comprises: a first arm member that is operatively connected to the motion generating device and pivoted thereby about a wiping pivot axis; and, a second arm member that is pivotally attached to the first arm member about the pullback pivot axis; and,
   the wiping pivot axis is substantially perpendicular to the pullback pivot axis.

8. The vehicle of claim 7 wherein:
   the vehicle further comprises: at least a first ground engaging wheel operatively supported to the frame; and, a body supported to the frame and comprising a windshield that defines the wiping surface; and,
   the wiper lifter is supported to the body.

9. The vehicle of claim 1 wherein the arm is movable substantially parallel to the pullback pivot axis based on the inherent flexibility of the wiper assembly.

10. A wiper assembly for use with an associated vehicle having a frame; a wiping surface supported to the frame; and a wiper lifter that is juxtaposed to the wiping surface, the wiper assembly comprising:
    a pivot motion generating device that is supportable to the frame;
    an arm that is operatively connected to the pivot motion generating device and that is pivotal about a pullback pivot axis;
    a blade assembly that is removably attachable to the arm; that comprises a blade having a contact surface; and, that is pivotally attached to the arm by attachment means about a blade pivot axis;
    wherein the wiper assembly is positional into:
    (1) a first condition wherein: the pivot motion generating device pivots the arm; and, the blade contact surface contacts the wiping surface;
    (2) a second condition wherein the blade assembly contacts the wiper lifter to lift the blade away from the wiping surface;
    (3) a third condition wherein: the arm is pivoted away from the wiping surface about the pullback pivot axis to a pullback angle; and, the blade assembly is irremovable from the arm by retention of the attachment means due to physical interference between the wiper assembly and the wiper lifter when the blade assembly is pivoted about the blade pivot axis; and,
    (4) a fourth condition wherein: the arm is pivoted away from the wiping surface about the pullback pivot axis to the pullback angle; the blade assembly is moved substantially parallel to the pullback pivot axis; and, the blade assembly is removable from the arm by release of the attachment means without physical interference between the wiper assembly and the wiper lifter when the blade assembly is pivoted about the blade pivot axis.

11. The wiper assembly of claim 10 wherein:
    the wiper assembly comprises: a pivot limiter that limits the pivotal motion of the arm away from the wiping surface about the pullback pivot axis to a pivot limit angle; and,
    the pivot limit angle is the pullback angle.

12. The wiper assembly of claim 11 wherein the pivot limit angle is greater than 10 degrees and less than 40 degrees.

13. The wiper assembly of claim 12 wherein the pivot limit angle is greater than 20 degrees and less than 30 degrees.

14. The wiper assembly of claim 10 wherein:
the attachment means comprises: a blade attachment member that: (1) is pivotally attached to the arm about the blade pivot axis; and, (2) is attached to the blade; and,
the blade pivot axis is substantially parallel to the pullback pivot axis.

15. The wiper assembly of claim 14 wherein:
when the wiper assembly is positioned into the third and fourth conditions, the blade attachment member is pivotal about the pullback pivot axis into a position where a longitudinal axis of the blade is substantially perpendicular to the wiping surface without the blade assembly physically contacting the wiping surface.

16. The wiper assembly of claim 14 wherein:
the arm comprises: a first arm member that is operatively connected to the motion generating device and pivoted thereby about a wiping pivot axis; and, a second arm member that is pivotally attached to the first arm member about the pullback pivot axis; and,
the wiping pivot axis is substantially perpendicular to the pullback pivot axis.

17. The wiper assembly of claim 10 wherein the arm is movable substantially parallel to the pullback pivot axis based on the inherent flexibility of the wiper assembly.

* * * * *